(12) United States Patent
Rommelmann et al.

(10) Patent No.: US 7,902,964 B2
(45) Date of Patent: Mar. 8, 2011

(54) HYBRID SYSTEM OPTION KEY

(75) Inventors: Heiko Rommelmann, Penfield, NY (US); Alberto Rodriguez, Webster, NY (US); Theon Sanders, Horst (NL)

(73) Assignee: Xerox Corporation, Norwalk, CT (US)

( * ) Notice: Subject to any disclaimer, the term of this patent is extended or adjusted under 35 U.S.C. 154(b) by 945 days.

(21) Appl. No.: 11/758,375

(22) Filed: Jun. 5, 2007

(65) Prior Publication Data

US 2008/0303640 A1  Dec. 11, 2008

(51) Int. Cl.
*H04Q 5/22* (2006.01)

(52) U.S. Cl. ............... 340/10.51; 340/10.52; 340/539.1; 340/572.1; 235/375

(58) Field of Classification Search ............... 340/10.51, 340/10.52, 5.2–5.31, 572.1, 572.2, 572.8, 340/10.1, 539.1; 235/375–385
See application file for complete search history.

(56) References Cited

U.S. PATENT DOCUMENTS

| | | | | |
|---|---|---|---|---|
| 5,465,401 | A * | 11/1995 | Thompson | 455/558 |
| 5,787,174 | A * | 7/1998 | Tuttle | 713/189 |
| 5,927,050 | A * | 7/1999 | Houck et al. | 53/428 |
| 6,032,004 | A | 2/2000 | Mirabella, Jr. et al. | |
| 6,046,676 | A * | 4/2000 | Ward et al. | 340/572.1 |
| 6,177,860 | B1 * | 1/2001 | Cromer et al. | 340/10.1 |
| 6,281,795 | B1 * | 8/2001 | Smith et al. | 340/572.1 |
| 6,557,758 | B1 * | 5/2003 | Monico | 235/380 |
| 6,876,295 | B1 * | 4/2005 | Lewis | 340/10.34 |
| 6,885,288 | B2 * | 4/2005 | Pincus | 340/10.51 |
| 7,049,962 | B2 * | 5/2006 | Atherton et al. | 340/572.1 |
| 7,149,884 | B2 * | 12/2006 | O'Connor et al. | 713/1 |
| 7,183,924 | B1 * | 2/2007 | Ku | 340/572.1 |
| 7,277,016 | B2 * | 10/2007 | Moskowitz et al. | 340/572.3 |
| 7,503,632 | B2 * | 3/2009 | Imanaka et al. | 347/5 |
| 7,652,575 | B2 * | 1/2010 | Lyons et al. | 340/572.1 |
| 2004/0233065 | A1 * | 11/2004 | Freeman | 340/825.49 |
| 2005/0068152 | A1 * | 3/2005 | Umehara et al. | 340/5.8 |
| 2006/0049947 | A1 | 3/2006 | Forster | |
| 2006/0119487 | A1 | 6/2006 | Atkinson et al. | |
| 2007/0115130 | A1 * | 5/2007 | Eveland | 340/572.7 |
| 2007/0146138 | A1 * | 6/2007 | Phipps et al. | 340/572.7 |
| 2008/0048837 | A1 * | 2/2008 | Montgomery et al. | 340/10.51 |
| 2008/0048838 | A1 * | 2/2008 | Montgomery et al. | 340/10.51 |

FOREIGN PATENT DOCUMENTS

| | | |
|---|---|---|
| GB | 2376673 A | 12/2002 |
| WO | 0126047 A1 | 4/2001 |
| WO | 02103700 A1 | 12/2002 |

OTHER PUBLICATIONS

European Patent Office Communication Search Report dated Dec. 4, 2009, pp. 1-7.
Chinese Office Action, CN Application No. 200810110350.8, Aug. 4, 2010, English Translation, 15 pages.

* cited by examiner

*Primary Examiner* — Benjamin C Lee
*Assistant Examiner* — Quang Pham
(74) *Attorney, Agent, or Firm* — Gibb I.P. Law Firm, LLC

(57) ABSTRACT

Embodiments herein place a product and a programmable device within a shipping package, seal the shipping package, and program the programmable device by transmitting wireless signals to the programmable device, without opening the shipping package. Then, after the device is programmed, the shipping package can be shipped to the end user (consumer). The programmable device is adapted to be connected to the product after the product and the programmable device are removed from the shipping package by the end user to enable different features of the product, depending upon the wireless signals that were transmitted to the programmable device.

20 Claims, 2 Drawing Sheets

US 7,902,964 B2

HYBRID SYSTEM OPTION KEY

BACKGROUND AND SUMMARY

Embodiments herein generally relate to systems, methods, services, etc. for programming features of products and more particularly to programming a system option key while the system option key is included within the shipping package.

The embodiments herein include a method that places a product and a programmable device within a shipping package, seals the shipping package, and programs the programmable device by transmitting wireless signals to the programmable device, without opening the shipping package. Then, after the device is programmed, the shipping package can be shipped to the end user (consumer). The programmable device is adapted to be connected to the product after the product and the programmable device are removed from the shipping package by the end user to enable different features of the product, depending upon the wireless signals transmitted to the programmable device.

Further, before or after the programming process, the embodiments herein can wirelessly communicate with the programmable device to track and inventory the shipping package without opening the shipping package. In some embodiments, the method can disable additional programming of the programmable device once the programming is complete.

The shipping package is intended to eventually be opened by the end user of the product. Further, the product is intended to be removed from the shipping package and plugged into or combined with the programmable device after the shipping package is shipped to and opened by the end user to selectively enable features of the product. In some embodiments, the method attaches the antenna of the programmable device to the shipping package in such a manner that the antenna is detached from the programmable device when the programmable device is removed from the shipping package.

Therefore, in specific apparatus embodiments, the system option key comprises some form of body or support structure that is to be connected to the shipping package. Again, this shipping package is adapted to maintain the product associated with the system option key. A programmable device (e.g., chip) is included either within or on (connected to) the body of the system option key. This programmable device is the element that selectively activates different features of the product, once it is connected to the product.

An antenna is physically connected to the body and the shipping package, and the antenna is operatively (directly or indirectly) connected to the programmable device. The antenna is adapted to receive wireless signals for programming the programmable device.

There is also at least one signal connector on an exterior of the body. This signal connector is adapted to connect to at least one corresponding connector on the product. When the signal connector is physically connected to the corresponding connector on the product, the programmable device thereby becomes operatively connected to the product. This connection of the system option key to the product selectively actives the different features of the product (depending upon the wireless signals transmitted to the programmable device through the antenna when the programmable device was programmed).

One feature of embodiments herein is that the body of the system option key comprises at least one "physical feature" that can allow optionally the programmable device to be programmed only while the body is connected to the shipping package.

In one example, this physical feature comprises the antenna being adapted to disconnect from the body and remain attached to the shipping package when the body is disconnected from the shipping package. For example, some embodiments herein include an antenna connection connecting the antenna to the body. This antenna connection is weaker than the connection between the shipping package and the antenna. This causes the antenna to become disconnected from the body and remain connected to the shipping package when the body is disconnected from the shipping package. In other embodiments, the antenna can be included as an integral part of the shipping package (formed between the laminated layers of the shipping package, printed on the shipping package, etc.) to ensure that the system option key can only be programmed while it is connected to the shipping package.

In another example, the physical feature comprises a programming switch on the exterior of the body. In a similar manner to the antenna, this programming switch is operatively connected to the programmable device. The programming switch can be adapted to change state (programming state or non-programming state) depending on whether the body is connected to the shipping package. The programmable device is controlled by the programming switch such that the programmable device can be programmed only when the programming switch indicates that the body is connected to the shipping package (programming state). In other words, the programmable device is prevented from being programmed when the switch is set to the non-programming state. Further, the programming switch can be permanently set to a non-programming state when the body is disconnected from shipping package. Thus, for example, the removal of the system option key from the shipping package can break a part of the programming switch to permanently leave the programming switch in a non-programming state.

Thus, this disclosure proposes a System Option Key (SOK) fabricated with a hybrid chip to enable programming of the chip potentially through the box to allow production and packaging of an otherwise generic product that can be customized (by means of programming of the SOK) as orders come in. Conventionally, SOKs need to be individually programmed, packaged and held in inventory in several versions to support order fulfillment.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

The embodiments herein provide processes, systems, services, computer programs, etc. to allow system option keys to be programmed while they are within sealed shipping containers.

System Options Keys (SOKs) include a chip embedded in an ISO card, sometimes in the form of a Subscriber Identification Module (SIM). SOK's are used to customize the product in question by turning on/off features based on customer requests. Conventionally, such SOK modules are programmed by means of physical contacts. Because of that, conventional SOK modules need to be programmed ahead of time and matched with the machines as they are dispatched to fulfill an order. This requires the inventory of SOKs in a variety of configurations, which are individually packaged.

This disclosure presents a SOK that makes use of a hybrid chip, one that has a radio frequency (RF) interface (antenna) in addition to physical contacts. The SOK is attached to the packaging (e.g., product box) in any appropriate location for ease of RF programming. The SOK can be placed in a pocket inside the box or glued, taped, bonded, etc. to the inside of the box. The radio frequency interface allows programming of the SOK through the box while the physical contacts enable communication with the product.

The hybrid SOK presented herein can be attached to the packaging at the vendor site or at the time the product is packaged. The chip's logic can allow the use of a command that disables the radio frequency interface completely (or only its write function) once the SOK has been programmed. If only the write function is disabled it is also possible to use the SOK to identify the product at later stages of the process. Alternatively, the antenna interface can be designed such that, when the customer removes the SIM, the antenna connections break, thus disabling the RF interface completely.

Figure 1:
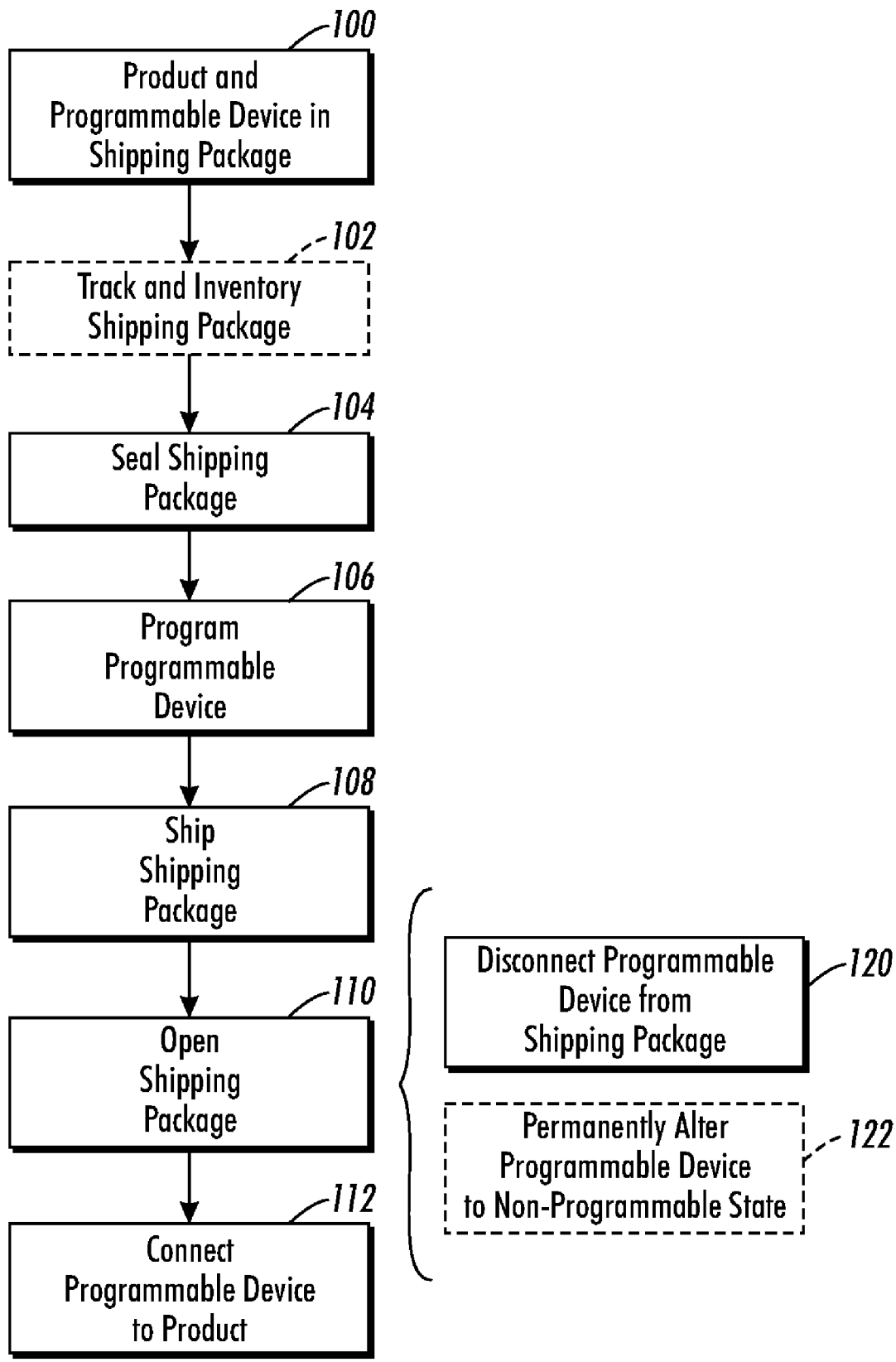
FIG. 1 is a flow diagram illustrating embodiments herein.

As shown in the flowchart in FIG. 1, one embodiment herein comprises a method that places (or attaches) a product and a programmable device within (or to) a shipping package (item 100), seals the shipping package (item 104), and programs the programmable device by transmitting wireless signals to the programmable device, without opening the shipping package (item 106).

Further, in some embodiments, at any time before or after the programming process, the embodiments herein can wirelessly communicate with the programmable device to track and inventory the shipping package without opening the shipping package, as shown in item 102. Alternatively, in some embodiments, the method can disable additional programming of the programmable device once the programming is complete in item 106.

Then, after the device is programmed, the shipping package can be shipped to the end user (consumer) potentially through many wholesalers, retailers and other middlemen, as shown in item 108. After the shipping package is opened and the product and programmable device are removed (item 110) the programmable device is to be connected to the product (item 112) to enable different features of the product, depending upon the wireless signals transmitted to the programmable device in item 106. Note that the programmable device can be programmed at any time before being opened by the end user. Therefore, any middleman or vendor could maintain a stock of generic products and customize the products as they are sold, simply by performing wireless RF programming through the packaging.

In some embodiments, in item 100 the method forms some type of physical connection between the programmable device and the shipping package such that the programmable device must be disconnected or detached from the shipping package in item 120. This disconnection/detachment optionally changes some physical feature of the programmable device that changes the programmable device to a non-programmable state in item 122. A number of examples of the physical change to the programmable device are discussed below. For example, in item 100, the antenna of the programmable device can be attached to the shipping package in such a manner that the antenna is detached from the programmable device when the programmable device is removed from the shipping package in item 120, thereby physically preventing the programmable device from being reprogrammed.

Figure 2:
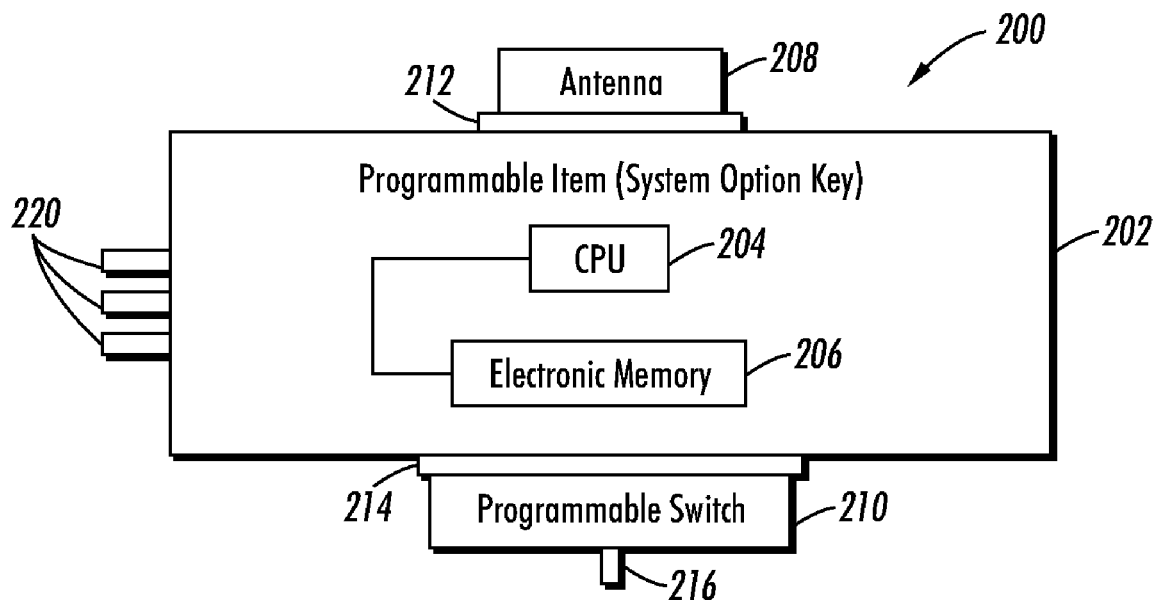
FIG. 2 is a schematic representation of a system option key according to embodiments herein.
Figure 3:
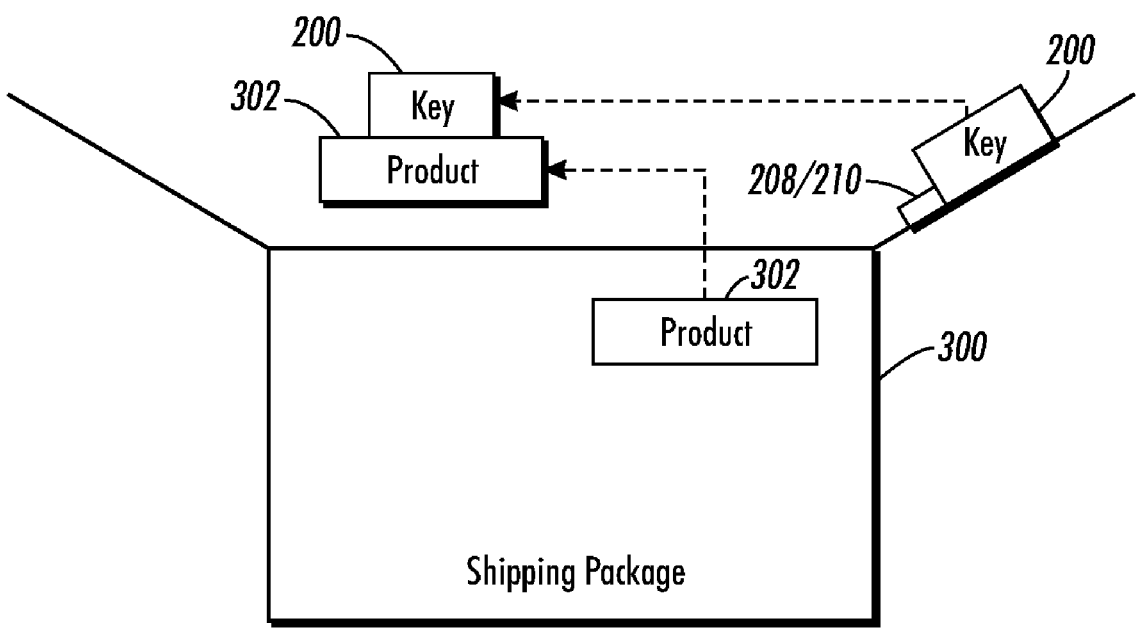
FIG. 3 is a schematic representation of a shipping package, product, and system option key according to embodiments herein.

FIG. 2 illustrates one specific apparatus embodiment of the programmable item 200 (e.g., a system option key) that comprises some form of body or support structure 202 that is to be connected to the shipping package. FIG. 3 illustrates one example of a shipping package 300 that is adapted to be sealed and to maintain (contain, hold, protect, etc.) the product 302 and associated system option key (programmable item) 200. The shipping package 300 is used principally as a storage and transport container, and is usually discarded after the product is removed therefrom. The product 302 can comprise any type of product having selectable features, depending upon user/vendor preferences. For example, the product 302 could comprise a printer, copier, computer, personal digital assistant, programmable vehicle or equipment, toy, tool, entertainment device, houseware device, etc., that has selectable features.

A programmable device (e.g., chip or central processing unit (CPU)) 204 is included either within or on (connected to) the body 202 of the system option key. This programmable device (chip) 204 is the element that selectively activates different features of the product 302. In addition, an electronic (volatile or non-volatile) memory 206 can be included within the system option key 200 to aid the chip's 204 functions and programming of the chip 204. Item 208 represents the antenna for wireless communication with the chip 204 and item 210 represents the programmable switch that can allow or prevent the chip from being programmed.

Various computerized devices are mentioned herein. Computers that include input/output devices, memories, processors, antenna, programmable switches, etc. are readily available devices produced by manufactures such as International Business Machines Corporation, Armonk N.Y., USA and Apple Computer Co., Cupertino Calif., USA. Such chips, antenna, switches, etc. commonly include input/output devices, power supplies, processors, electronic storage memories, wiring, etc., the details of which are omitted herefrom to allow the reader to focus on the salient aspects of the embodiments described herein.

The antenna 208 is physically connected to the body 202 and the antenna 208 is operatively (directly or indirectly) connected to the programmable device 204. The antenna 208 is adapted to receive wireless signals for programming the programmable device 204.

There is also at least one signal connector (e.g., contact pin, etc.) 220 on an exterior of the body 202. While three pin-type connectors are shown in FIG. 2, one ordinarily skilled in the art would understand that any form of connector (in any number) could be used to connect the system option key 202 to the product 302, to selectively enable features of the product 302. This signal connector 220 is adapted to connect to at least one corresponding (and matching) connector on the product 302. When the signal connector 220 is physically connected to the corresponding connector on the product 302, the programmable device 204 thereby becomes operatively connected to the product 302.

This connection of the system option key 200 to the product 302 through the connectors 220 selectively actives different features of the product 302 (depending upon the wireless signals transmitted to the programmable device 204 through the antenna 208 when the programmable device 204 was programmed). In other words, the product may be capable of providing many different features, but will only produce the features as allowed by the system option key 200.

Sometimes users are charged different amounts for different features of the product 302. Therefore, it may be desirable to prevent the user from reprogramming the system option key once it is removed from the shipping package 300 and attached to the product 302. The system option key 200 can be bonded, taped, glued, etc., to the shipping package 300, or can be attached to the shipping package 300 using a specially designed pouch or clip. One feature of embodiments herein is that the body 202 of the system option key 200 can comprise at least one "physical feature" that allows the programmable device 204 to be programmed only while the body 202 is connected to the shipping package 300.

In one example, this physical feature comprises the antenna 208 being adapted to disconnect from the body and remain attached to the shipping package 300 when the body 202 is disconnected from the shipping package 300, as shown in FIG. 3. For example, some embodiments herein include an antenna connection 212 connecting the antenna 208 to the body 202. This antenna connection 212 is weaker than the connection between the shipping package 300 and the antenna 208. The connections mentioned herein can comprise any appropriate material, such as glues, solders, metals, alloys, plastics, etc. This causes the antenna 208 to become disconnected from the body 202 and remain connected to the shipping package 300 when the body is disconnected from the shipping package 300.

In another example, the physical feature comprises a programming switch 210 on the exterior of the body 202. In a similar manner to the antenna 208, this programming switch 210 is operatively connected to the programmable device 204. The programming switch 210 is adapted to change state (programming state or non-programming state) depending on whether the body 202 is connected to the shipping package 300. The programmable device 204 is controlled by the programming switch 210 such that the programmable device 204 can be programmed only when the programming switch 210 indicates that the body 202 is connected to the shipping package 300 (programming state). In other words, the programmable device 204 is prevented from being programmed when the switch 210 is set to the non-programming state.

The programming switch 210 can be permanently set to a non-programming state when the body 202 is disconnected from shipping package 300. Thus, for example, the removal of the system option key 200 from the shipping package 300 can break a part of the programming switch 210 to permanently leave the programming switch 210 in a non-programming state. The removal of the system option key 200 can break a connection 214 that is similar to connection 212, discussed above. Thus, the connection 214 could also be weaker than the connection between the shipping package 300 and the programmable switch 210.

Alternatively, some physical feature 216 of the switch 210 could be intentionally broken off or pushed/pulled into a predetermined position by the separation of the programmable switch 210 from the shipping package 300 (when the system option key 200 is removed from the shipping package 300). One ordinarily skilled in the art would understand that the embodiments herein are not limited to these examples, and many other systems and structures could be used to place the switch 210 and chip 204 into a non-programmable state.

In other embodiments, the antenna 208 or switch 210 can be included as an integral part of the shipping package 300 (e.g., can be formed within or between the laminated layers of the shipping package 300, printed on the shipping package 300, etc.) and have appropriate connectors to the antenna 208 or switch 210, to ensure that the system option key can only be programmed while the system option key 200 is connected to the shipping package 300.

The word "printer" as used herein encompasses any apparatus, such as a digital copier, bookmaking machine, facsimile machine, multi-function machine, etc. which performs a print outputting function for any purpose. The details of printers, printing engines, etc. are well-known by those ordinarily skilled in the art and are discussed in, for example, U.S. Pat. No. 6,032,004, the complete disclosure of which is fully incorporated herein by reference. Printers are readily available devices produced by manufacturers such as Xerox Corporation, Stamford, Conn., USA. Such printers commonly include input/output, power supplies, processors, media movement devices, marking devices etc., the details of which are omitted herefrom to allow the reader to focus on the salient aspects of the embodiments described herein.

Thus, the embodiments herein provide a system option key that can be programmed through the box (shipping package) and that can be automatically set to a non-programmable state when the user unpacks the box. With such an arrangement, there is no need to inventory individually packaged and programmed SOKs, nor is there a need to inventory several different machine configurations. Instead, the embodiments herein provide the ability to produce "generic" machines that can be customized as necessary, which results in a simplified manufacturing process. Further, with embodiments herein the SOK can be used as an electronic label to track product through the supply chain. Further, the embodiments herein provide backwards compatibility with existing implementations of SOK devices.

All foregoing embodiments are specifically applicable to electrostatographic and/or xerographic machines and/or processes as well as to software programs stored on the electronic memory (computer usable data carrier) 206 and to services whereby the foregoing methods are provided to others for a service fee. It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof.

What is claimed is:

1. A method comprising:
   physically connecting an antenna and a programmable device to a shipping package;
   placing a product inside said shipping package;
   sealing said shipping package;
   determining whether said antenna and said programmable device remain connected to said shipping package;
   programming said programmable device by transmitting wireless signals to said programmable device, without opening said shipping package, based on said determining whether said antenna and said programmable device remain connected to said shipping package; and
   after said programming, shipping said shipping package,
   wherein, said programmable device is adapted to enable different features of said product, depending upon said wireless signals transmitted to said programmable device.

2. The method according to claim 1, further comprising wirelessly communicating with said programmable device to track and inventory said shipping package without opening said shipping package.

3. The method according to claim 1, wherein said programming comprises disabling additional programming of said programmable device once said programming is complete.

4. The method according to claim 1, further comprising an attachment attaching said antenna to said programmable device and to said shipping package wherein said antenna is detached from said programmable device when said programmable device is removed from said shipping package.

5. The method according to claim 1, wherein said shipping package is adapted to be opened by an end user of said product, and wherein said product is adapted to be removed from said shipping package and combined with said programmable device after said shipping package is shipped to and opened by said end user.

6. A method comprising:
   physically connecting an antenna and a programmable device to a shipping package;
   placing a product inside said shipping package;
   sealing said shipping package;
   determining whether said antenna and said programmable device remain connected to said shipping package;
   programming said programmable device by transmitting wireless signals to said programmable device, without opening said shipping package based on said determining whether said antenna and said programmable device remain connected to said shipping package; and
   after said programming, shipping said shipping package, wherein, said programmable device is adapted to be connected to said product after said product and said programmable device are removed from said shipping package to enable different features of said product, depending upon said wireless signals transmitted to said programmable device; and
   wherein, said programmable device is adapted to be set to a non-programming state by being disconnected from said shipping package.

7. The method according to claim 6, further comprising wirelessly communicating with said programmable device to track and inventory said shipping package without opening said shipping package.

8. The method according to claim 6, wherein said programming comprises disabling additional programming of said programmable device once said programming is complete.

9. The method according to claim 6, further comprising an attachment attaching said antenna to said programmable device and to said shipping package wherein said antenna is detached from said programmable device when said programmable device is removed from said shipping package.

10. The method according to claim 6, wherein said shipping package is adapted to be opened by an end user of said product, and wherein said product is adapted to be removed from said shipping package and combined with said programmable device after said shipping package is shipped to and opened by said end user.

11. An apparatus comprising:
    a product;
    a shipping package adapted to maintain said product;
    a body physically connected to said shipping package;
    a programmable device one of within and connected to said body, wherein said programmable device is adapted to activate features of said product;
    an antenna frangibly connected to said body on a first end and fixedly connected to said shipping package on a second end such that said antenna becomes disconnected from said body when said body is disconnected from said shipping package, wherein said antenna is operatively connected to said programmable device and is adapted to receive wireless signals for programming said programmable device; and
    at least one signal connector on an exterior of said body,
    wherein said signal connector is adapted to connect to at least one corresponding connector on said product,
    wherein when said signal connector is connected to said corresponding connector on said product, said programmable device is operatively connected to said product to selectively activate different ones of said features of said product, depending upon said wireless signals transmitted to said programmable device through said antenna, and
    wherein said body is adapted to allow said programmable device to be programmed only while said body is connected to said shipping package via said antenna.

12. The apparatus according to claim 11, wherein said antenna is adapted to disconnect from said body and remain attached to said shipping package when said body is disconnected from said shipping package.

13. The apparatus according to claim 11, further comprising an antenna connection connecting said antenna to said body, wherein said antenna connection is weaker than a connection between said shipping package and said antenna, such that said antenna becomes disconnected from said body and remains connected to said shipping package when said body is disconnected from said shipping package.

14. The apparatus according to claim 11, further comprising a programming switch on said exterior of said body and operatively connected to said programmable device,
    wherein said programming switch is adapted to change state depending on whether said body is connected to said shipping package,
    wherein said programmable device is controlled by said programming switch such that said programmable device can be programmed only when said programming switch indicates that said body is connected to said shipping package.

15. The apparatus according to claim 14, wherein said programming switch is permanently set to a non-programming state when said body is disconnected from shipping package, and wherein said programmable device is prevented from being programmed when said switch is set to said non-programming state.

16. An apparatus comprising:
    a body adapted to be connected to a shipping package, wherein said shipping package is adapted to maintain a product;
    a programmable device one of within and connected to said body, wherein said programmable device is adapted to activate features of said product;
    an antenna frangibly connected to said body on a first end and fixedly connected to said shipping package on a second end such that said antenna becomes disconnected from said body when said body is disconnected from said shipping package, wherein said antenna is operatively connected to said programmable device and is adapted to receive wireless signals for programming said programmable; and
    at least one signal connector on an exterior of said body,
    wherein said signal connector is adapted to connect to at least one corresponding connector on said product,
    wherein when said signal connector is connected to said corresponding connector on said product, said programmable device is operatively connected to said product to selectively activate different ones of said features of said product, depending upon said wireless signals transmitted to said programmable device through said antenna, and wherein said body comprises at least one physical feature that allows said programmable device to be programmed only while said body is connected to said shipping package via said antenna.

17. The apparatus according to claim 16, wherein said physical feature comprises said antenna being adapted to disconnect from said body and remain attached to said shipping package when said body is disconnected from said shipping package.

18. The apparatus according to claim 16, wherein said physical feature comprises an antenna connection connecting said antenna to said body, wherein said antenna connection is weaker than a connection between said shipping package and said antenna, such that said antenna becomes disconnected from said body and remains connected to said shipping package when said body is disconnected from said shipping package.

19. The apparatus according to claim 16, wherein said physical feature comprises a programming switch on said exterior of said body and operatively connected to said programmable device, wherein said programming switch is adapted to change state depending on whether said body is connected to said shipping package, wherein said programmable device is controlled by said programming switch such that said programmable device can be programmed only when said programming switch indicates that said body is connected to said shipping package.

20. The apparatus according to claim 19, wherein said programming switch is permanently set to a non-programming state when said body is disconnected from shipping package, and wherein said programmable device is prevented from being programmed when said switch is set to said non-programming state.

* * * * *